US009355662B2

(12) United States Patent
Peng et al.

(10) Patent No.: US 9,355,662 B2
(45) Date of Patent: *May 31, 2016

(54) POLARIZATION ROTATOR (71) Applicant: Seagate Technology LLC, Cupertino, CA (US)

(72) Inventors: Chubing Peng, Eden Prairie, MN (US); Yongjun Zhao, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,140

(22) Filed: Jun. 2, 2015

(65) Prior Publication Data

US 2015/0262597 A1    Sep. 17, 2015

Related U.S. Application Data

(63) Continuation of application No. 13/872,447, filed on Apr. 29, 2013.

(60) Provisional application No. 61/733,122, filed on Dec. 4, 2012.

(51) Int. Cl.
*G02B 6/00*    (2006.01)
*G11B 5/48*    (2006.01)
*G11B 5/31*    (2006.01)
*G02B 6/126*    (2006.01)
(Continued)

(52) U.S. Cl.
CPC .............. *G11B 5/4866* (2013.01); *G02B 6/126* (2013.01); *G02B 6/2726* (2013.01); *G11B 5/314* (2013.01); *G02B 6/274* (2013.01); *G11B 2005/0021* (2013.01)

(58) Field of Classification Search
CPC ...... G02B 6/2746; G02B 6/126; G02B 6/105; G02B 6/272; G02B 6/26; H04B 10/2569
USPC .......................................... 385/11, 15, 27, 31
See application file for complete search history.

(56) References Cited

U.S. PATENT DOCUMENTS

| | | | |
|---|---|---|---|
| 6,546,161 B2 | 4/2003 | Okuno et al. |
| 7,366,362 B2 | 4/2008 | Tanimura |
| 7,663,982 B2 | 2/2010 | Cho et al. |

(Continued)

FOREIGN PATENT DOCUMENTS

| | | |
|---|---|---|
| JP | 05-055808 A | 3/1993 |
| JP | 05-235603 A | 9/1993 |

(Continued)

OTHER PUBLICATIONS

Beggs et al, "Compact polarization rotators for integrated polarization diversity in InP-based waveguides", Optics Letters, vol. 32, No. 15, Aug. 1, 2007, pp. 2176-2178.

(Continued)

*Primary Examiner* — Jennifer Doan
(74) *Attorney, Agent, or Firm* — HolzerIPLaw, PC (57) ABSTRACT

A polarization rotator for a recording head. The polarization rotator comprises a first waveguide coupled to an input coupler at a first end and a second waveguide. The first waveguide is offset from the second waveguide and a second end of the first waveguide is coupled to a second end of the second waveguide.

20 Claims, 11 Drawing Sheets (51) Int. Cl.
  *G02B 6/27* (2006.01)
  *G11B 5/00* (2006.01)

(56) References Cited

U.S. PATENT DOCUMENTS

| | | |
|---|---|---|
| 7,885,492 B2 | 2/2011 | Welch et al. |
| 9,070,386 B2 * | 6/2015 | Peng .................. G02B 6/126 |
| 2011/0103201 A1 | 5/2011 | Peng et al. |
| 2012/0163139 A1 | 6/2012 | Vavra et al. |
| 2012/0163750 A1 | 6/2012 | Chen |

FOREIGN PATENT DOCUMENTS

| | | |
|---|---|---|
| JP | 2001-272561 A | 10/2001 |
| JP | 2010-040112 A | 2/2010 |
| JP | 2012-079398 A | 4/2012 |
| KR | 2007-0075661 A | 7/2007 |
| KR | 2012-0071366 A | 7/2012 |

OTHER PUBLICATIONS

Office Action dated Feb. 16, 2016 from corresponding Japan Application #2013-250037.

* cited by examiner

POLARIZATION ROTATOR

CROSS-REFERENCE TO RELATED APPLICATIONS

This application is a continuation of U.S. patent application Ser. No. 13/872,447 filed Apr. 29, 2013, now U.S. Pat. No. 9,070,386, which claims priority to U.S. Provisional Patent Application No. 61/733,122 filed Dec. 4, 2012, which are incorporated herein in their entirety.

BACKGROUND

Heat assisted magnetic recording (HAMR) generally refers to the concept of locally heating a recording medium to reduce the coercivity. This allows the applied magnetic writing fields to more easily direct the magnetization during the temporary magnetic softening caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the $K_u$ or coercivity is reduced such that the magnetic write field is sufficient to write to the media. Once the media cools to ambient temperature, the coercivity has a sufficiently high value to assure thermal stability of the recorded information. Better designs are needed to increase efficiency, alignment, precision, and reduced size of the local heating.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

A polarization rotator comprises a first waveguide configured to be coupled to an input coupler at a first end and a second waveguide, wherein the first waveguide is offset from the second waveguide and a second end of the first waveguide is coupled to a second end of the second waveguide. These and various other features and advantages will be apparent from a reading of the following detailed description.

BRIEF DESCRIPTION OF THE DRAWINGS

A further understanding of the nature and advantages of the present technology may be realized by reference to the following figures, which are described in the remaining portion of the specification.

DETAILED DESCRIPTION

For heat assisted magnetic recording, an electromagnetic wave of, for example, visible, infrared, or ultraviolet light can be directed from the airbearing surface (ABS) of a recording head onto a surface of a data storage medium to raise the temperature of a localized area to facilitate switching. The main difficulty with HAMR has been discovering a technique that is able to conduct sufficient light energy into the storage medium to heat it by several hundred degrees, but only in the area that is desired to be recorded. If the optical spot is larger than this area, it will extend to neighboring bits and tracks on the disc, heat those areas as well, and the data recorded in those areas may be erased. Confining the optical spot to an area that is much smaller than a wavelength of light, and well below the so-called "diffraction limit" that can be achieved by standard focusing lenses, is an area of study called "near field optics" or "near field microscopy."

Well-known optical condensers such as solid immersion lenses (SILs), solid immersion mirrors (SIMs), and mode index lenses have been proposed for use in near field optics to reduce the size of a spot on the medium that is subjected to the electromagnetic radiation. Sits, SIMs, and mode index lenses alone are not sufficient to achieve focal spot sizes necessary for high areal density recording due to diffraction limited optical effects. Metal pins and other near field transducer (NFT) designs positioned at the focal point of the waveguide are used to further concentrate the energy and direct it to a small spot on the surface of the recording medium.

Some types of NFTs for HAMR use transverse magnetic (TM) mode excitation. Laser diodes typically operate in a transverse electric (TE) mode where the laser diode emits light with polarization parallel to the junction. TM mode laser is available usually only at limited light wavelengths, for instance, visible, 808 nm or 1550 nm. To achieve low surface-plasmon propagation loss in the NFT, light sources of longer wavelength (>808 nm) are preferred, for instance, 975 nm. The implementations disclosed herein provide a light delivery apparatus including a polarization rotator, which couples light from a laser diode of TE mode into a HAMR waveguide, and rotates the mode of the light from TE mode to TM mode for NFT excitation.

Figure 1:
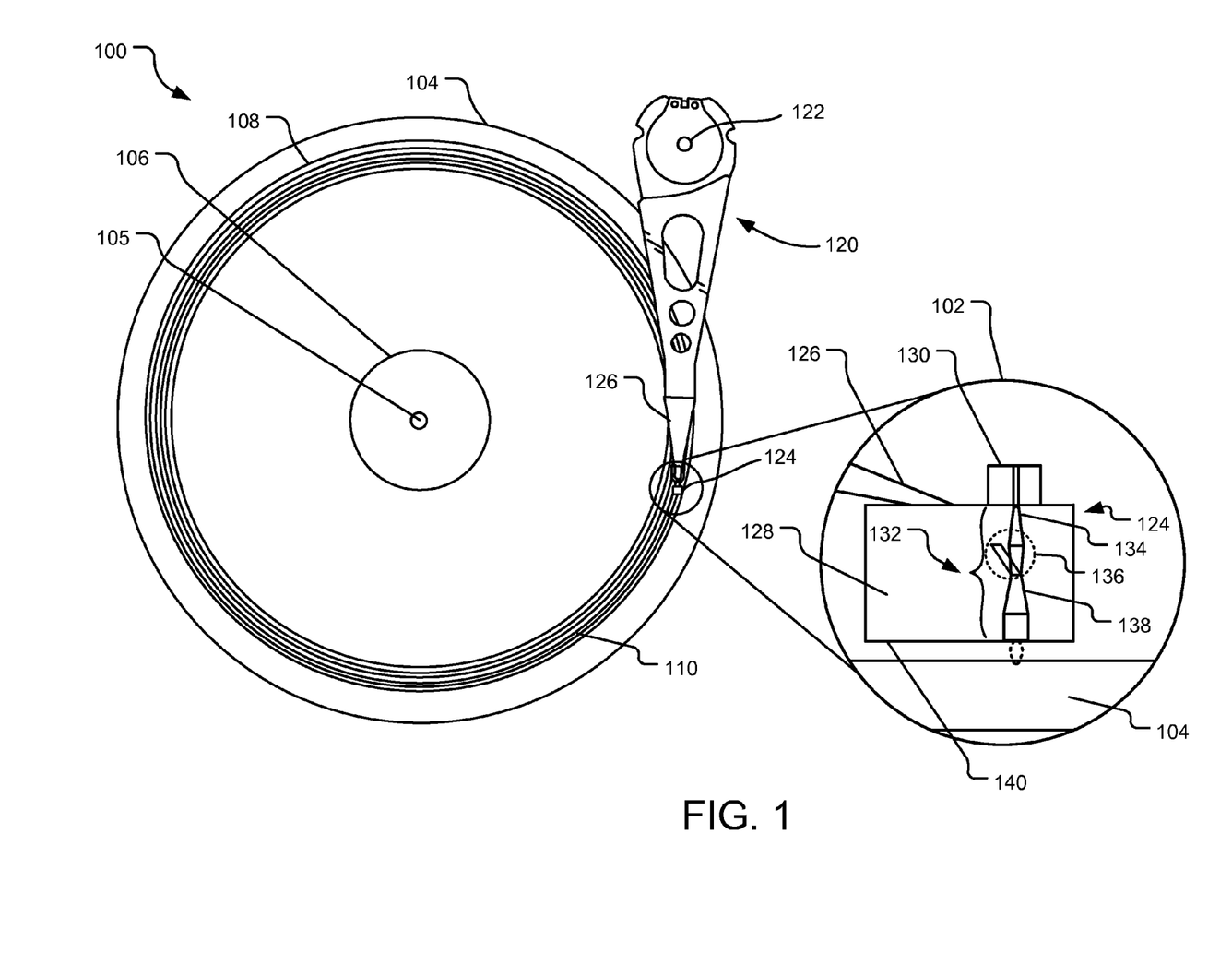
FIG. 1 is a schematic plan view of a data storage device having an example polarization rotator.

FIG. 1 illustrates a data storage device 100 having an example polarization rotator, shown in more detail in an exploded view 102. Although other implementations are contemplated, in the illustrated implementation, the data storage device 100 includes a storage medium 104 (e.g., a magnetic data storage disc) on which data bits can be recorded using a magnetic write pole and from which data bits can be read using a magnetoresistive element. The storage medium 104 rotates about a spindle center or a disc axis of rotation 105 during rotation, and includes an inner diameter 106 and an outer diameter 108 between which are a number of concentric data tracks 110. It should be understood that the described technology may be used with a variety of storage formats, including continuous magnetic media, discrete track (DT) media, shingled media, etc.

Information may be written to and read from data bit locations in the data tracks on the storage medium 104. A transducer head assembly 124 is mounted on an actuator assembly 120 at an end distal to an actuator axis of rotation 122. The transducer head assembly 124 flies in close proximity above the surface of the storage medium 104 during disc rotation. The actuator assembly 120 rotates during a seek operation about the actuator axis of rotation 122. The seek operation positions the transducer head assembly 124 over a target data track for read and write operations.

In an implementation employing Heat-Assisted-Magnetic-Recording (HAMR), the recording action is assisted by a heat source applied to a bit location on the storage medium 104. The data bits (e.g., user data bits, servo bits, etc.) are stored in very small magnetic grains embedded within layers of the storage medium 104. The data bits are recorded in the magnetic grains within tracks 110 on the storage medium.

Generally, HAMR technology employs a storage medium (such as the storage medium 104) having a very high magnetic anisotropy, which contributes to thermal stability of the magnetization of the small magnetic grains in the storage medium 104. By temporarily heating the storage medium 104 during the recording process, the magnetic coercivity of the magnetic grains can be selectively lowered below an applied magnetic write field in a tightly focused area of the storage medium 104 that substantially corresponds to an individual data bit. The heated region is then rapidly cooled in the presence of the applied magnetic write field, which encodes the recorded data bit in the heated region based on the polarity of the applied magnetic write field. After cooling, the magnetic coercivity substantially returns to its pre-heating level, thereby stabilizing the magnetization for that bit. This write process is repeated for multiple data bits on the storage medium, and such data bits can be read using a magnetoresistive read head.

The exploded view 102 schematically illustrates a cross-sectional view of the transducer head assembly 124, as seen from a cross-track perspective. The transducer head assembly 124 is supported by a suspension 126 extending from the arm of the actuator assembly 120. In the implementation illustrated in the exploded view 102, the transducer head assembly 124 includes, among other features, a slider 128, a light source 130 (e.g., a laser), and a light delivery apparatus 132. An air-bearing surface 140 of the slider 128 "flies" across the surface of the storage medium 104, reading and writing data bits from and to the magnetic grains in the surface of the storage medium 104.

The light source 130 directs light into the light delivery apparatus 132. The light delivery apparatus 132 includes an input coupler 134, a polarization rotator 136, and an NFT adapter 138. There are various methods of launching light into a light delivery apparatus 132. In one implementation, a laser diode is butt-coupled to a receiving end of the input coupler 134. In an alternative implementation, other methods of coupling the light into the light delivery apparatus 132 may be used. The light coupled into the input coupler 134 may be laser light having TE mode of polarization.

A narrow end of the input coupler 134 may be coupled with the light source 130, whereas a broader end of the input coupler 134 may be coupled with the polarization rotator 136. The polarization rotator 136 may consist of a two-waveguide overlay structure, which is disclosed in further detail in FIG. 2. Specifically, the two waveguides may be offset from each other at an end of the polarization rotator attached to the input coupler. At the other end of the polarization rotator, which may be coupled to the NFT adapter 138, the two waveguides may be joined to each other. The overlay structure of the polarization rotator 136 with the two waveguides wherein at one end the waveguides are offset from each other results in rotation of the polarization of the light energy travelling through the waveguides.

In one implementation, the end of the polarization rotator 136, where the waveguides of the polarization rotator 136 are attached, is coupled to the NFT adapter. The light energy output from the polarization rotator 136 is into the NFT adapter 138. Thus, the NFT adapter 138 propagates the light output from the polarization rotator 136 towards a near field transducer (NFT) (not shown). Near field optics of the NFT make use of apertures and/or antennas to cause a thermal increase in a data bit location on the surface of the storage medium 104 (e.g., via surface plasmon effects). As a result, data bit location on the surface is heated, selectively reducing the magnetic coercivity of the magnetic grains at the data bit location, relative to other areas of the surface. Accordingly, a magnetic field applied to the heated data bit location (as it cools) is sufficient to record a data bit at the location without disturbing data bits in adjacent, non-heated bit locations. In one implementation, the magnetic field is supplied to a write pole in the transducer head assembly 124, wherein the write pole is positioned in the near proximity of the NFT. In this manner, the heating area can substantially determine the writable area (e.g., the data bit dimension).

Figure 2:
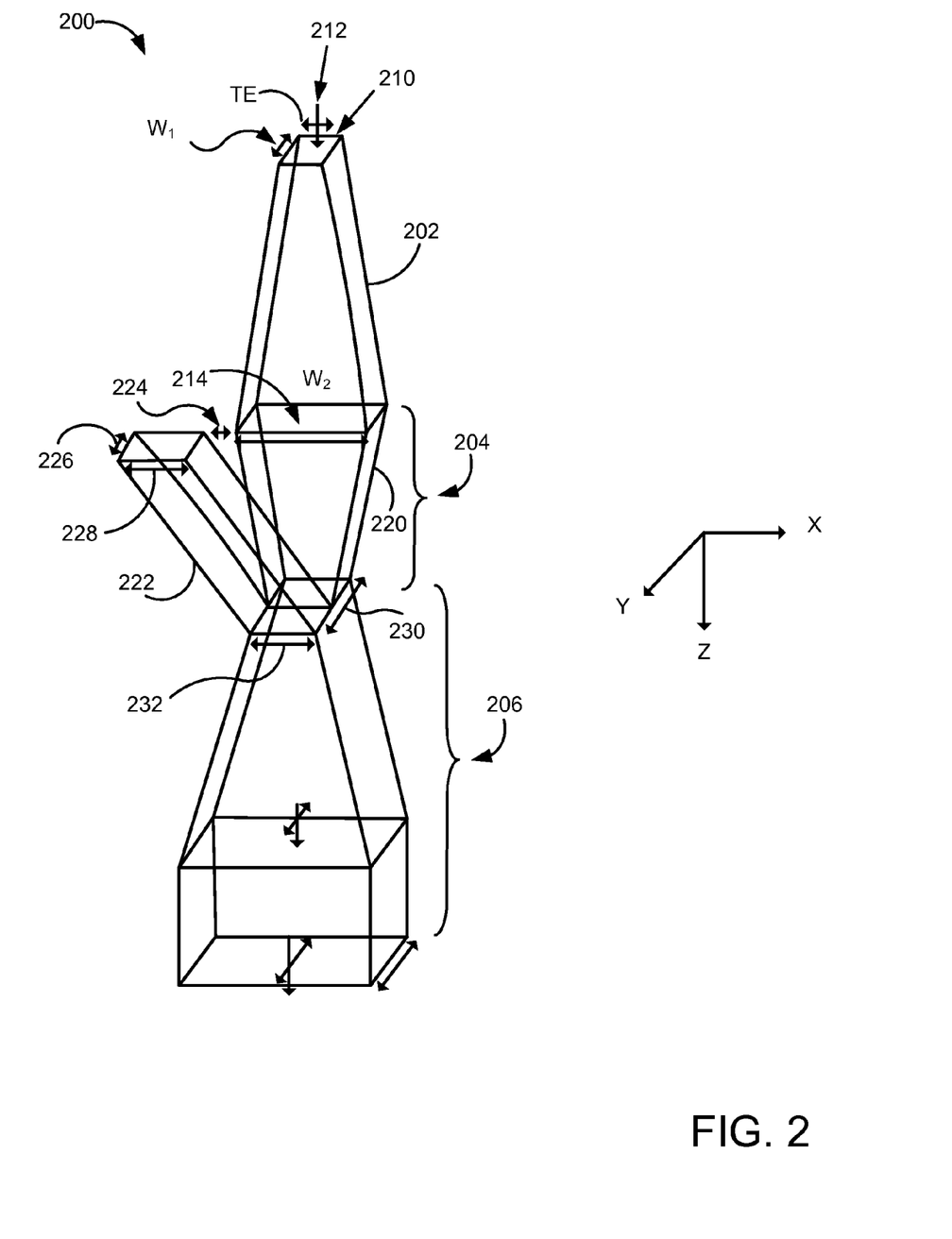
FIG. 2 is a schematic perspective view of a light delivery apparatus including an example polarization rotator.

FIG. 2 illustrates a light delivery apparatus 200 including an example polarization rotator. Specifically, the light delivery apparatus 200 includes an input coupler 202, a polarization rotator 204, and an NFT adapter 206. The illustrated implementation of the input coupler 202 has rectangular end surfaces and trapezoidal side surfaces. The first end surface 210 of the input coupler 202 may be butt-coupled to a source of light energy (not shown). For example, the light source attached to the first end surface 210 may be a transverse electric (TE) mode laser diode that generates light energy 212 with TE mode polarization parallel to the x-axis (as illustrated in FIG. 2).

In one implementation, the input coupler 202 includes an assisted coupler layer underneath a core and an inverse taper in the core layer. The input coupler 202 may have a tapered shape with rectangular cross-sections on each end. A top surface at the narrow end of the core layer may be coupled with the light source, such as a laser diode. For example, the width $w_1$ of the top surface in the y direction is half the width $w_2$ in the x direction of the second end surface 214 of the input coupler. The input coupler 202 propagates the light energy coupled from the laser diode from the first end surface 212 to the second end surface 214. In one implementation, the polarization of the light energy propagated through the input coupler 202 does not change. As a result the polarization of the light energy at the second surface is also in the TE mode.

The second surface 214 of the input coupler 202 is coupled with the polarization rotator 204. Specifically, the polarization rotator includes a first waveguide 220 and a second waveguide 222, wherein a top surface of the first waveguide 220 is coupled with the second surface 214 of the input coupler. In one implementation, the first waveguide 220 may have differing widths along the x-direction from the beginning of the first waveguide 220 to the end of the first waveguide 220. In the illustrated implementation, the dimensions of the top surface of the first waveguide 220 are substantially the same as the dimensions of the second surface 214 of the input coupler 202. Furthermore, in the illustrated implementation, the first waveguide 220 is tapered along its length in the z direction, such that the cross-section of the top surface of the first waveguide 220 is larger than the cross-section of the bottom surface of the first waveguide 220.

The first waveguide 220 and the second waveguide 222 are separated from each other at the top end of the polarization rotator 204 and they are joined to each other at the bottom end of the polarization rotator 204. In one implementation, the offset 224 between the first waveguide 220 and the second waveguide 222 is optimized such that as the light energy propagates through the polarization rotator 204, the polarization of the light energy is rotated from the TE mode (being parallel to the x-axis) to a transverse magnetic (TM) mode (being parallel to the y-axis). For example, in the illustrated implementation, where the width $w_1$ is 200 nm, and the width $w_2$ is 400 nm, the offset 224 is 100 nm.

The second waveguide 222, which is joined to the first waveguide 220 at the bottom of the polarization rotator 204 may have a different shape compared to the first waveguide 220. For example, in the illustrated implementation, the second waveguide 222 has end surfaces with substantially similar cross-sections. Specifically, each of the end surfaces of the second waveguide has square cross-sections with width 226 and thickness 228 of 200 nm. As the first waveguide 220 and the second waveguide 222 are joined at the bottom end of the polarization rotator 204, the joined waveguides have a thickness 230 that is substantially equal to twice the width 232.

The geometry of the polarization rotator 204 is such that as the light energy propagates through the polarization rotator 204, the polarization of the light energy changes by approximately ninety degrees. Thus, with the light energy input to the polarization rotator 204 having TE mode polarization that is parallel to the x-axis, the light energy output from the bottom surface of the polarization rotator 204 has TM mode polarization that is substantially parallel to the y-axis. Alternatively, the polarization rotator 204 functions as a fiber cable that is twisted by ninety degrees from one end to the other end and resulting in rotation of the polarization of light energy travelling through it.

The bottom surface of the polarization rotator 204 is coupled with the NFT adapter 206. In the illustrated implementation of the light delivery vehicle 200, the NFT adapter 206 is tapered such that a top surface of the NFT adapter 206 has a cross-section that is smaller than the cross-section of the bottom surface of the NFT adapter 206. In such an implementation, the NFT adapter 206 acts as a beam expander for the light energy beam propagating through the NFT adapter 206. In an alternative implementation, the NFT adapter 206 may have a top surface with a wider cross-section compared to the cross-section of the bottom surface, resulting in the NFT adapter 206 shrinking the light energy beam traveling through it. The bottom surface of the NFT adapter 206 is coupled with an NFT (not shown) that transduces the light energy into heat energy that is to be focused onto a magnetic media. In an alternative implementation, the NFT adapter 206 may be configured to have expanded waveguide propagation mode compared to propagation mode of the polarization rotator 204. Alternatively, the NFT adapter 206 may be configured to have reduced waveguide propagation mode compared to propagation mode of the polarization rotator 204.

Figure 3:
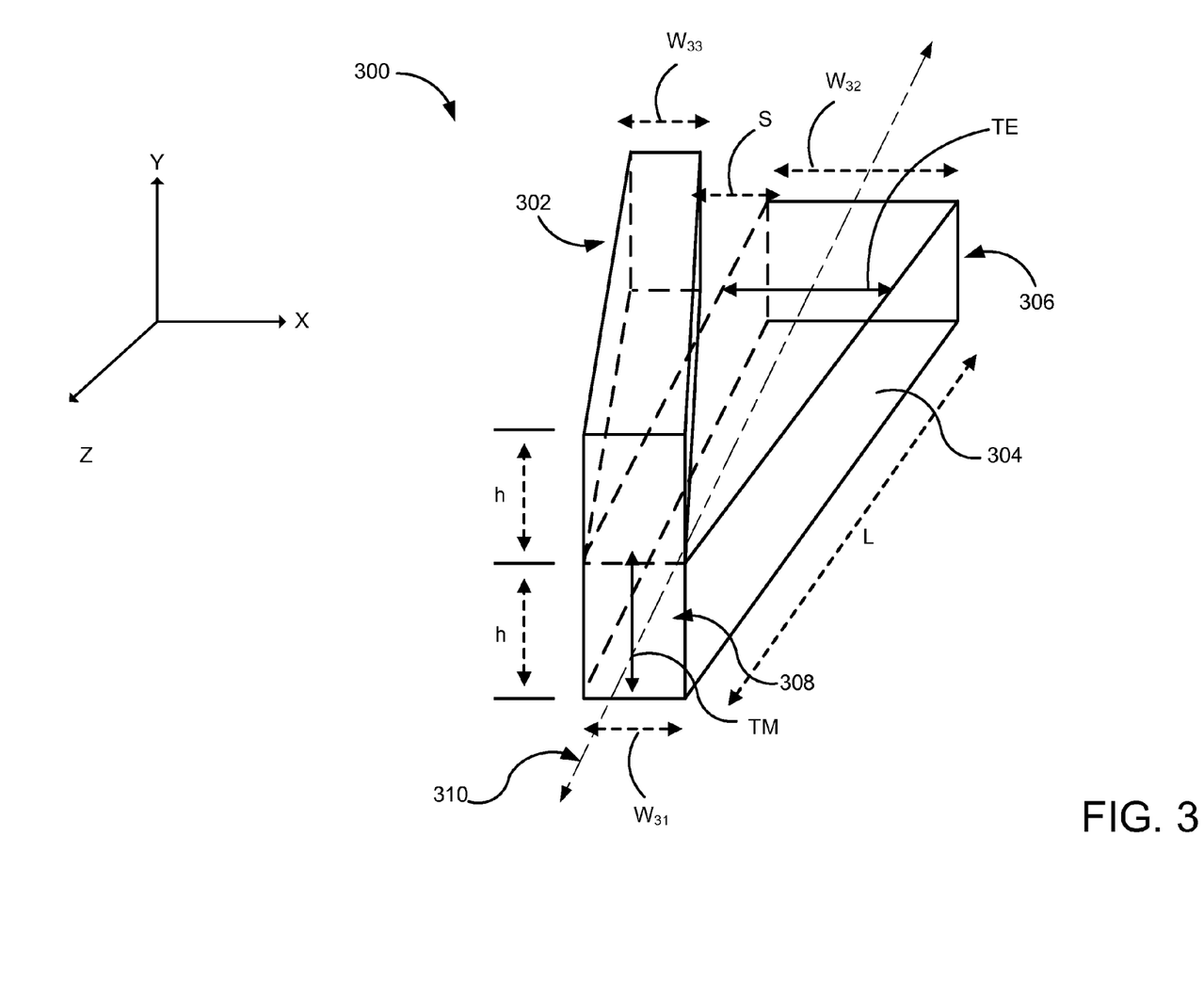
FIG. 3 is a schematic perspective view of an example layout of a polarization rotator.

FIG. 3 illustrates an example layout of a polarization rotator 300. The polarization rotator 300 includes a top core 302 and a bottom core 304. The light energy is propagated though a first end 306 of the polarization rotator 300 to a second end 308, as illustrated by the propagation 310. In one implementation, each of the top core 302 and the bottom core 304 are made of $Ta_2O_5$. Specifically, each of the top core 302 and the bottom core 304 are made of $Ta_2O_5$ core with index of refraction n=2.09 and $Al_2O_3$ cladding with index of refraction of n=1.65. In this implementation, the length L of the polarization rotator 300 along the direction (z-axis) of propagation of light energy through the polarization rotator 300 is 50 μm (note that the dimensions in FIG. 3 are not to scale). The height h of each of the cores 302 and 304 is 200 nm. In one implementation, the separation s of the top core 302 and the bottom core 304 at one end of the polarization rotator 300 is optimized so as to achieve high conversion efficiency from TE mode to TM mode for the light energy propagating through the polarization rotator 300.

In the illustrated implementation, the width $W_{31}$ at the second end 308 of the polarization rotator is 200 nm. On the other hand, the width $W_{32}$ of the bottom core 304 at the first end of 306 is 400 nm and the width $W_{33}$ of the top core 302 at the first end 306 is 200 nm. The implementation of the polarization rotator 300 illustrated in FIG. 3 results in better than approximately 95% efficiency from TE mode polarization at the first end 306 to TM mode polarization at the second end 308.

The implementation of the polarization rotator 300 may be implemented with an etch layer between the top core 302 and the bottom core 304. For example, a 20 nm etch stop layer of $Y_2O_3$, with an index of refraction of n=1.90, may be disposed between the top core 302 and the bottom core 304.

Figure 4:
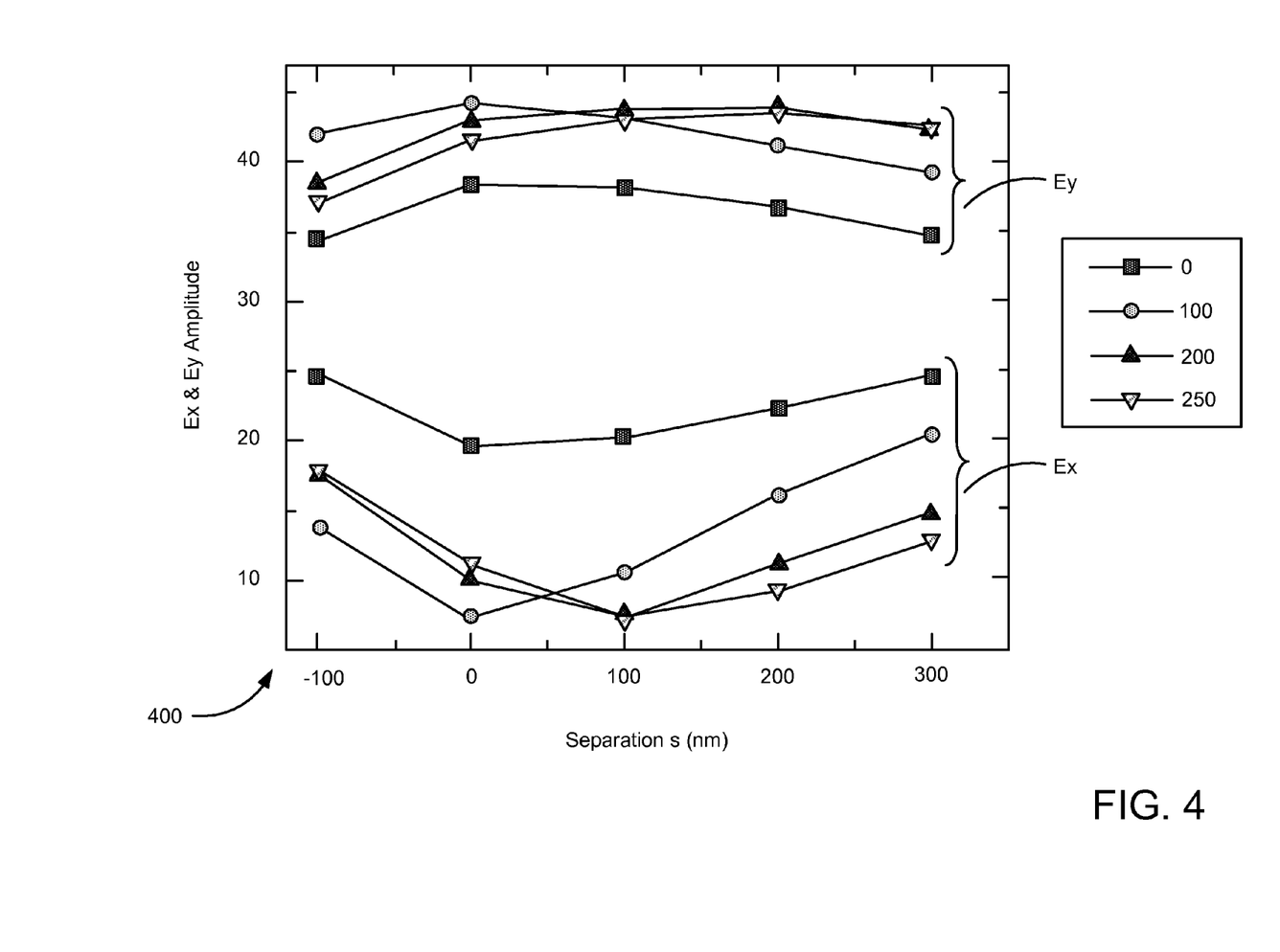
FIG. 4 is an example graph illustrating modeling results of field amplitude at the end of a polarization rotator.

FIG. 4 illustrates an example graph 400 illustrating modeling results of field amplitude at the end of a polarization rotator. Specifically, the graph 400 illustrates the relation between the amplitudes of the components of light energy at the end of the polarization rotator from where the light energy propagates out of the polarization rotator (such as the second end 308 in FIG. 3). The x-axis of the graph 400 denotes the width of the separation s between the top core and bottom core of the polarization rotator at the end of the polarization rotator where the light energy propagates into of the polarization rotator (such as the first end 306 in FIG. 3). The y-axis of the graph 400 denotes the electric field amplitude component with TE polarization ($E_x$) and the electric field amplitude component with TM polarization ($E_y$). Specifically, each of the four lines at the top of the graph 400 denotes the electric field component with TM polarization ($E_y$) at various core start width w of 0, 100, 200, and 250 nm. On the other hand, each of the four lines at the bottom of the graph 400 denotes the electric field component with TE polarization ($E_x$) at various core start width w of 0, 100, 200, and 250 nm. As seen from the graph, with separation in the range of 0-200 nm, for each of the core start width w of 100, 200, and 250, over 95% of the light energy is polarized in with TM polarization.

Figure 5:
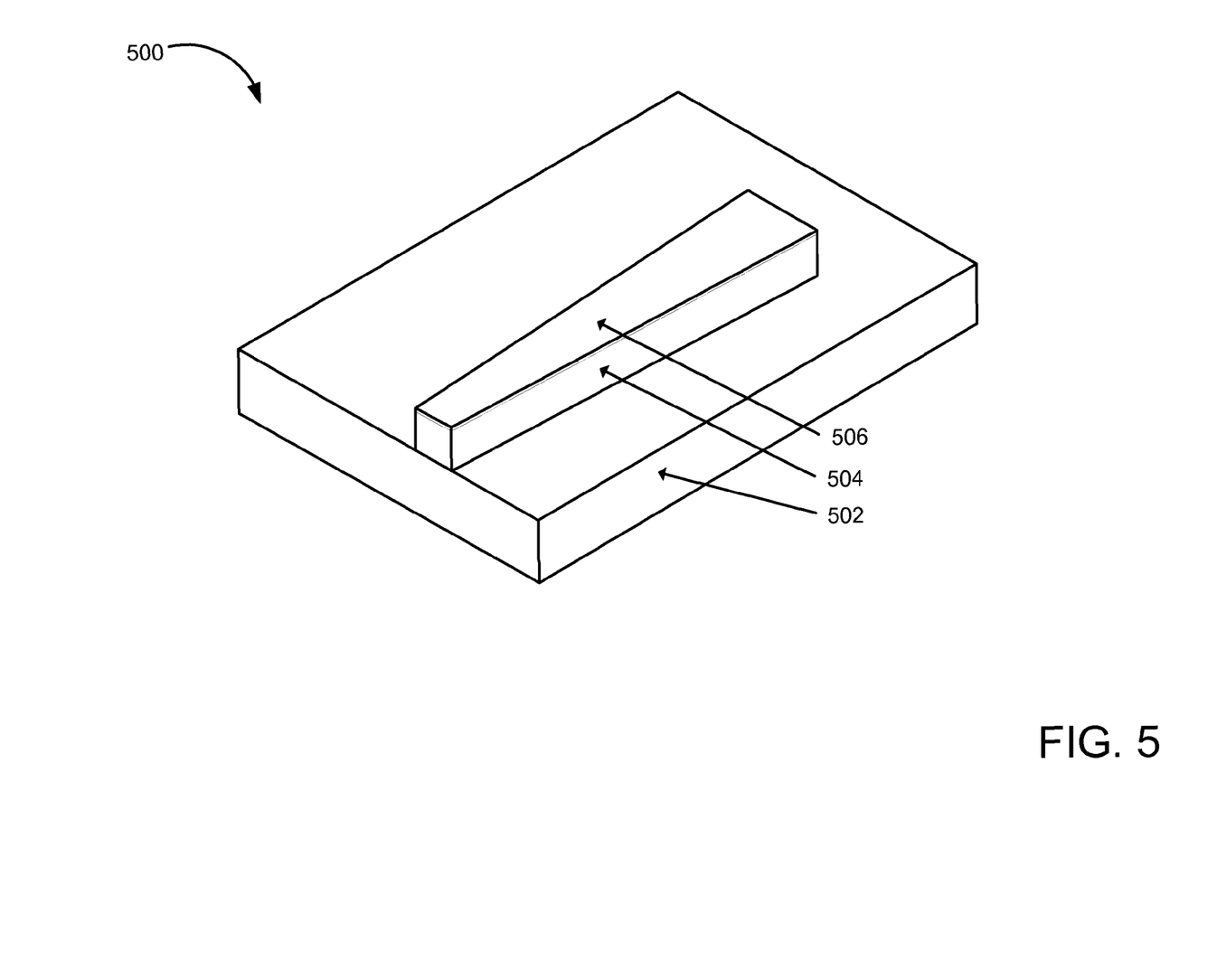
FIG. 5 is a schematic perspective view of an example partial implementation at a production stage of a polarization rotator.

FIGS. 5-10 illustrate various stages of a process for manufacturing a polarization rotator disclosed herein. Specifically, FIG. 5 illustrates an example partial implementation 500 at a production stage of a polarization rotator. The partial implementation 500 includes a bottom cladding 502 on which a core layer 504 is deposited. In the illustrated implementation, the thickness of the core layer 504 is 200 nm. Subsequently, a hard mask (HM) layer 506 is deposited on the core layer 504. In one implementation, the HM layer 506 may be made of amorphous carbon (aC). After the deposition of the HM layer 506, the core layer 504 is etched, stopping at the cladding layer 502. As a result of the etching of the core layer 504, the HM layer 506 may be reduced to around 20 to 30 nm. In one implementation, the etching may be achieved using an inductive coupled plasma (ICP) etching method.

Figure 6:
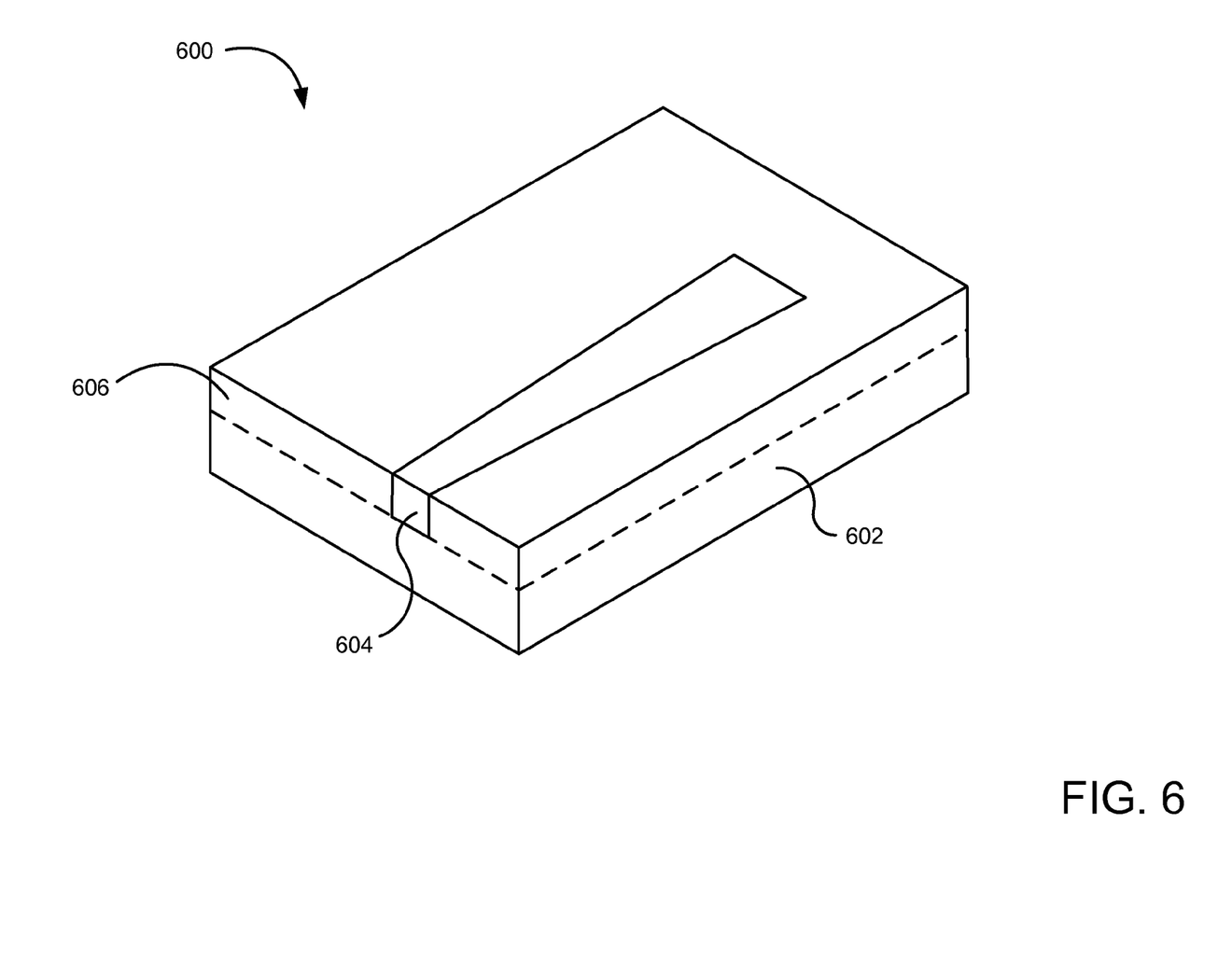
FIG. 6 is a schematic perspective view of another example partial implementation at a production stage of a polarization rotator.

FIG. 6 illustrates another example partial implementation 600 at a production stage of a polarization rotator. The partial implementation 600 includes a bottom cladding layer 602 and a core 604 on which another cladding layer 606 is deposited. For example the thickness of the cladding layer 606 is approximately 280 nm. After depositing the cladding layer 606, the top surface of the partial implementation 600 is polished flat using a chemical-mechanical polishing (CMP) process stopping at an aC HM layer on top of the core layer 604. Subsequently, the aC HM layer on top of the core layer 604 is ashed away using an oxygen ash process.

Figure 7:
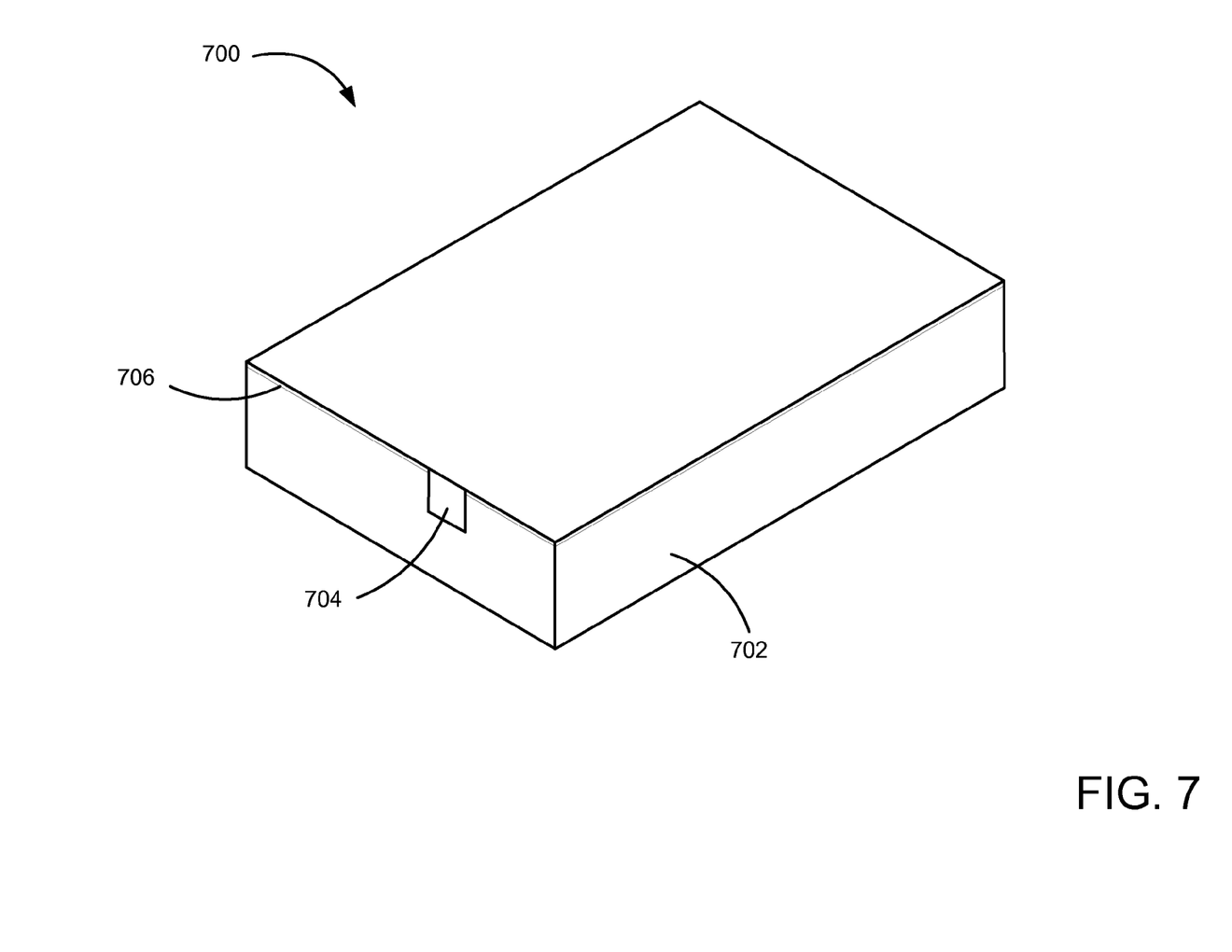
FIG. 7 is a schematic perspective view of another example partial implementation at a production stage of a polarization rotator.

FIG. 7 illustrates another example partial implementation 700 at a production stage of a polarization rotator. The partial implementation 700 includes a cladding 702 partially surrounding a core 704 and an etch stop layer 706 deposited on top of the assembly of the cladding 702 and the core 704. In one implementation, the etch stop layer 706 is made of $Y_2O_3$ having a thickness of 20 nm.

Figure 8:
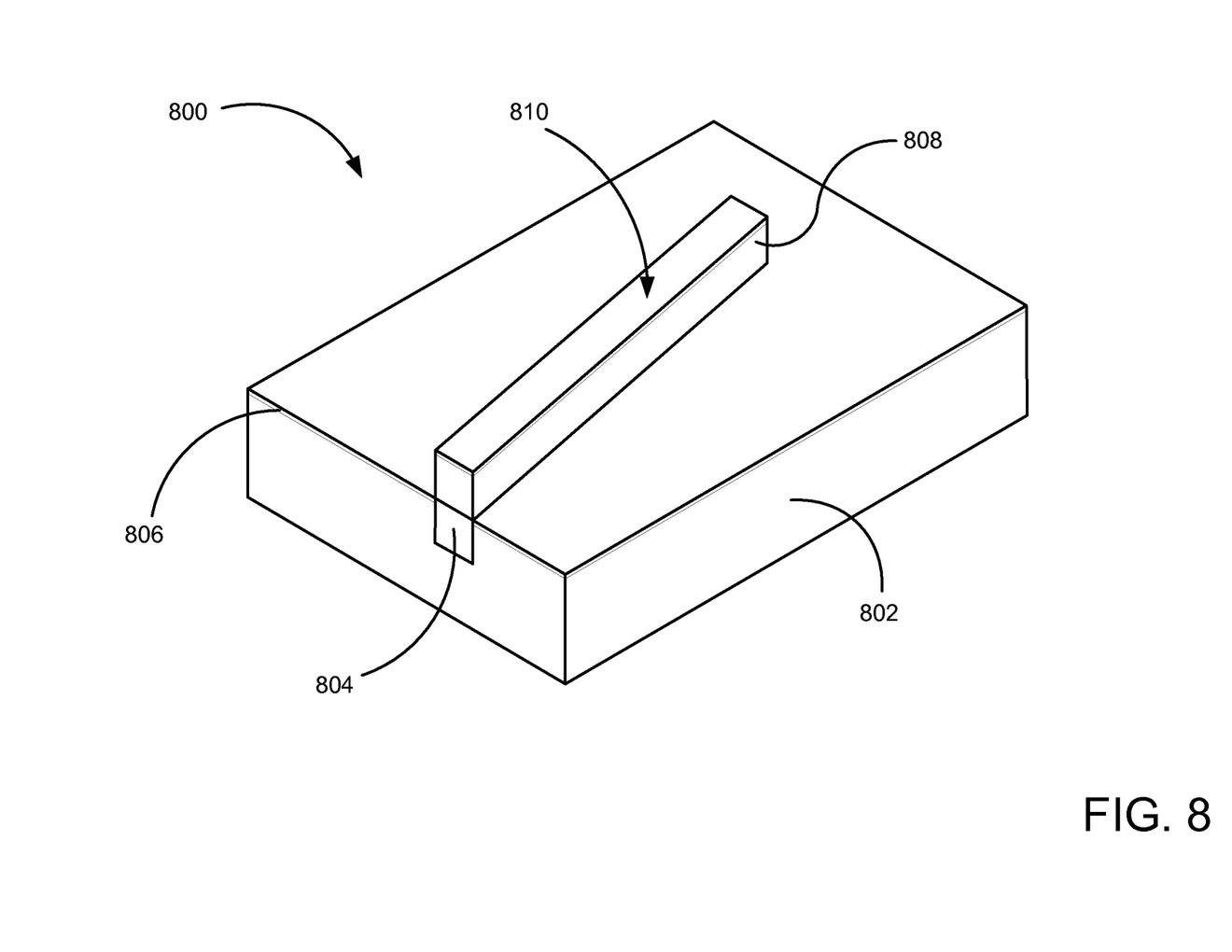
FIG. 8 is a schematic perspective view of another example partial implementation at a production stage of a polarization rotator.

FIG. 8 illustrates another example partial implementation 800 at a production stage of a polarization rotator. The partial implementation 800 includes a cladding 802 partially surrounding a bottom core 804 and an etch stop layer 806 deposited on top of the assembly of the cladding 802 and the bottom core 804. Furthermore, a top core layer 808 and an HM layer 810 made of aC are deposited on top of the etch stop layer 806 in a manner illustrated above in FIG. 5.

Figure 9:
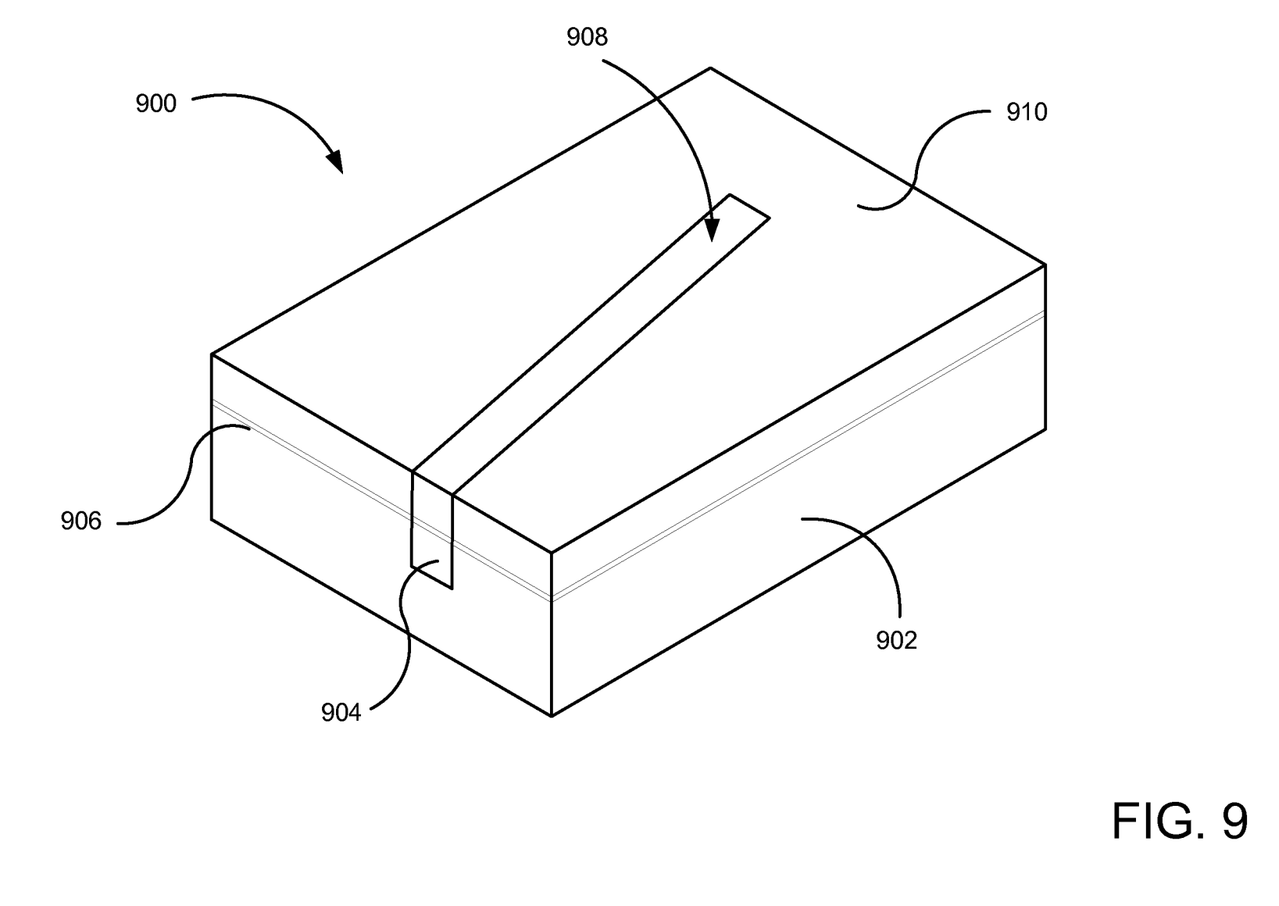
FIG. 9 is a schematic perspective view of another example partial implementation at a production stage of a polarization rotator.

FIG. 9 illustrates another example partial implementation 900 at a production stage of a polarization rotator. The partial implementation 900 includes a bottom cladding 902 partially surrounding a bottom core 904 and an etch stop layer 906 deposited on top of the assembly of the bottom cladding 902 and the bottom core 904. Furthermore, the partial implementation 900 also includes a top core 908 and top cladding 910. The top surface of the assembly of the top core 908 and the top cladding 910 is polished using a CMP polish process.

Figure 10:
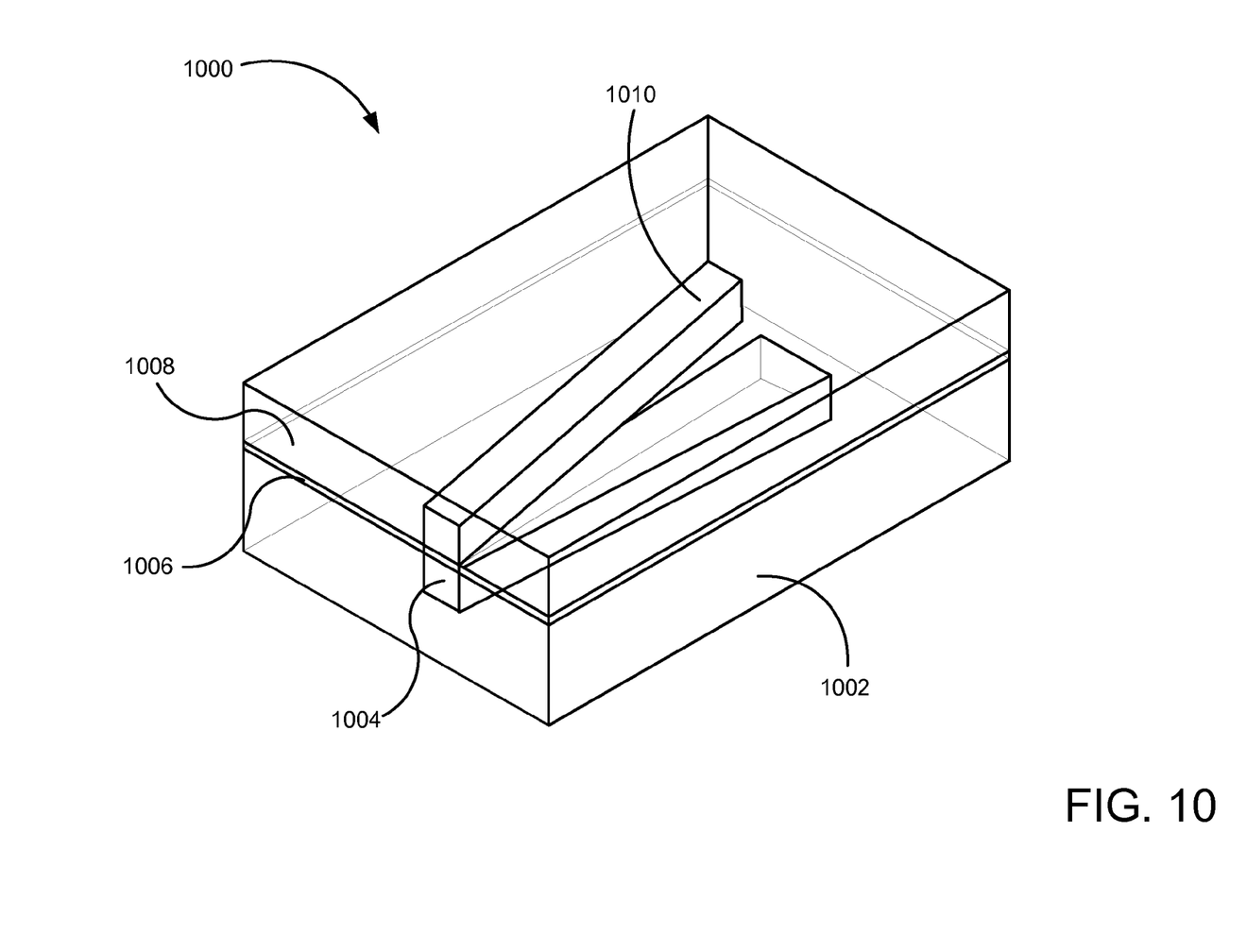
FIG. 10 is a schematic perspective view of another example partial implementation at a production stage of a polarization rotator.

FIG. 10 illustrates example implementation a polarization rotator 1000. Specifically, the polarization rotator 1000 includes a bottom cladding 1002, a bottom core 1004, an etch stop layer 1006, a top cladding 1008, and a top core 1010.

Figure 11:
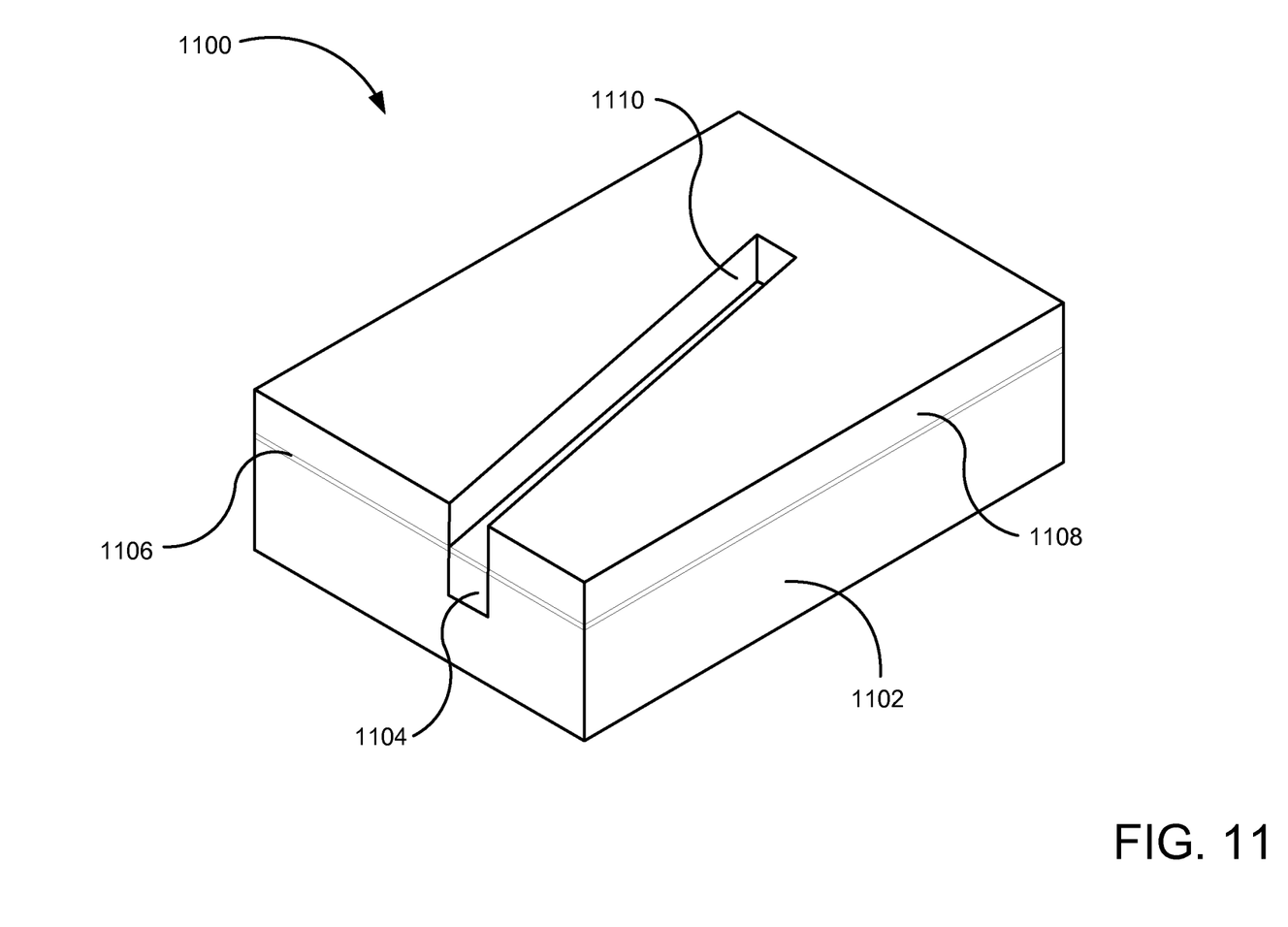
FIG. 11 is a schematic perspective view of another example partial implementation at a production stage of a polarization rotator.

FIG. 11 illustrates another example implementation a polarization rotator 1100. The polarization rotator 1100 includes a bottom cladding 1102, a bottom core 1104, and an etch stop layer 1106. Subsequently, a top cladding layer 1108 is deposited on top of the etch stop layer 1106. For example, the thickness of the top cladding layer 1108 is similar to the thickness of a top core. An HM layer of aC is deposited on top of the second cladding layer 1108 and a trench 1110 is etched in the top cladding layer. Subsequently, the trench 1110 may be filled with a core layer to form the top core (not shown). The top surface of the top core and the top cladding are polished using CMP process. Finally the aC HM layer on top of the top cladding is ashed away using, for example, an oxygen ash process.

Although the present invention has been described with reference to preferred embodiments, workers skilled in the art will recognize that changes may be made in form and detail without departing from the scope of the invention. The implementations described above and other implementations are within the scope of the following claims.

The invention claimed is:

1. A light delivery apparatus for a recording head comprising:
   an input coupler configured to couple light energy;
   a polarization rotator comprising a first waveguide coupled to the input coupler and a second waveguide offset from the first waveguide; and
   a near field transducer (NFT) adapter coupled to the polarization rotator.

2. The light delivery apparatus of claim 1, wherein the polarization rotator is configured to rotate a polarization state of the light energy orthogonally.

3. The light delivery apparatus of claim 2, wherein the polarization rotator rotates the polarization state of the light energy from transverse electric (TE) polarization state to transverse magnetic (TM) polarization state.

4. The light delivery apparatus of claim 1, wherein the NFT adapter is configured to have expanded waveguide propagation mode compared to propagation mode of the polarization rotator.

5. The light delivery apparatus of claim 1, wherein the NFT adapter is configured to have reduced waveguide propagation mode compared to propagation mode of the polarization rotator.

6. The light delivery apparatus of claim 1, wherein a first end of the first waveguide is coupled to the input coupler and a second end of the first waveguide is coupled to a second end of the second waveguide.

7. The light delivery apparatus of claim 6, wherein the second end of the first waveguide is also coupled to the NFT adapter.

8. The light delivery apparatus of claim 6, wherein a second end of the second waveguide is also coupled to the NFT adapter.

9. The light delivery apparatus of claim 8, wherein a cross-section of the first end of the first waveguide has a width that is substantially twice the thickness of the cross-section of the first end of the second waveguide.

10. The light delivery apparatus of claim 8, wherein a cross-section of the second end of the first waveguide is substantially similar to cross-section of the second end of the second waveguide.

11. The light delivery apparatus of claim 1, wherein the input coupler has rectangular end surfaces and trapezoidal side surfaces.

12. The light delivery apparatus of claim 1, wherein the input coupler has a reverse taper.

13. The light delivery apparatus of claim 1, wherein the first waveguide has a taper.

14. A polarization rotator for a recording head comprising:
   a first waveguide operably coupled to a light source at a first end; and
   a second waveguide,
   wherein the first waveguide is offset from the second waveguide and a second end of the first waveguide is coupled to a second end of the second waveguide.

15. The polarization rotator of claim 14, wherein the first waveguide has a taper from its first end to its second end.

16. The polarization rotator of claim 14, wherein the cross-section of the first end of the first waveguide has a width that is substantially twice the thickness of the cross-section.

17. The polarization rotator of claim 14, wherein a cross-section of the second end of the first waveguide is substantially similar to cross-section of the second end of the second waveguide.

18. The polarization rotator of claim 14, wherein the second end of the first waveguide and the second end of the second waveguide are coupled to an NFT adapter.

19. A light delivery apparatus for a data recording head comprising:
   an input coupler configured to couple light energy from a laser diode; and
   a polarization rotator coupled to the input coupler, wherein the polarization rotator is configured to rotate polarization state of the light energy orthogonally.

20. The apparatus of claim 19, wherein the polarization rotator rotates the polarization state of the light energy from transverse electric (TE) polarization state to transverse magnetic (TM) polarization state.

* * * * *